US008534194B2

(12) United States Patent
Whitelaw et al.

(10) Patent No.: US 8,534,194 B2
(45) Date of Patent: Sep. 17, 2013

(54) ROTARY PRINTING PRESS AND METHOD FOR ADJUSTING A CYLINDER THEREOF

(75) Inventors: Gordon Whitelaw, Bilgola (AU); Georg Grautoff, Bielefeld (DE); Andreas Kückelmann, Ibbenbüren (DE)

(73) Assignee: Bobst Bielefeld GmbH (DE)

( * ) Notice: Subject to any disclaimer, the term of this patent is extended or adjusted under 35 U.S.C. 154(b) by 575 days.

(21) Appl. No.: 12/446,738

(22) PCT Filed: Sep. 28, 2007

(86) PCT No.: PCT/EP2007/008456
§ 371 (c)(1),
(2), (4) Date: Apr. 22, 2009

(87) PCT Pub. No.: WO2008/049500
PCT Pub. Date: May 2, 2008

(65) Prior Publication Data
US 2010/0018419 A1    Jan. 28, 2010

(30) Foreign Application Priority Data

Oct. 23, 2006  (EP) .................................. 06022135
Dec. 19, 2006  (DE) ......................... 10 2006 060 464
Mar. 30, 2007  (DE) .................... 20 2007 004 717 U

(51) Int. Cl.
*B41F 13/08* (2006.01)
*G01B 21/20* (2006.01)

(52) U.S. Cl.
USPC ............. 101/486; 101/484; 33/550; 33/555.1

(58) Field of Classification Search
USPC ......................................... 101/486, DIG. 46
See application file for complete search history.

(56) References Cited

U.S. PATENT DOCUMENTS

| | | | |
|---|---|---|---|
| 2,859,532 A | 11/1958 | Fogg | 33/618 |
| 3,185,088 A | 5/1965 | Norton | 101/484 |
| 3,615,143 A * | 10/1971 | Barr et al. | 33/505 |
| 3,855,523 A * | 12/1974 | Pirlet | 324/207.25 |
| 3,969,826 A | 7/1976 | Ottenhues et al. | 101/486 |
| 4,437,403 A | 3/1984 | Greiner | |
| 4,510,866 A | 4/1985 | Sekizawa et al. | 101/365 |
| 4,553,478 A * | 11/1985 | Greiner et al. | 101/484 |

(Continued)

FOREIGN PATENT DOCUMENTS

DE      3136703 C1    11/1982
DE    195 27 199       1/1997

(Continued)

OTHER PUBLICATIONS

The Office Action dated Mar. 16, 2010 from related U.S. Appl. No. 11/612,592.

Primary Examiner — Jill Culler
(74) Attorney, Agent, or Firm — Ostrolenk Faber LLP

(57) ABSTRACT

A method of adjusting a roller (18) in a rotary printing press (10), includes the steps of a) mounting the roller (18) in a preparation rack (24) so as to be rotatably supported therein, b) scanning the peripheral surface of the roller, thereby to detect a topography of the roller surface, c) deriving set data for the adjustment of the roller from the topography, and storing the set data, d) mounting the roller in the printing press (10), and e) adjusting the roller in accordance with the set data.

6 Claims, 11 Drawing Sheets

(56) References Cited

U.S. PATENT DOCUMENTS

| | | | |
|---|---|---|---|
| 4,586,148 A | 4/1986 | Rehder et al. | 101/DIG. 46 |
| 4,672,893 A | 6/1987 | Mammarella | 101/170 |
| 4,694,749 A | 9/1987 | Takeuchi et al. | 101/492 |
| 4,821,425 A * | 4/1989 | Currie et al. | 33/520 |
| 4,903,413 A * | 2/1990 | Bellwood | 33/551 |
| 5,117,081 A * | 5/1992 | Bagdal | 33/550 |
| 5,197,200 A * | 3/1993 | Bahr et al. | 33/555.1 |
| 5,521,497 A * | 5/1996 | Schneider et al. | 324/207.22 |
| 5,676,058 A | 10/1997 | Ireton | 101/486 |
| 5,761,821 A * | 6/1998 | Laycock | 33/555.1 |
| 5,771,811 A | 6/1998 | Siler et al. | 101/486 |
| 6,089,083 A * | 7/2000 | Curtis | 73/146 |
| 6,283,019 B1 | 9/2001 | Dolves | 101/485 |
| 6,634,297 B2 | 10/2003 | Poetter et al. | 101/484 |
| 6,684,517 B2 * | 2/2004 | Corghi | 33/550 |
| 6,845,712 B2 | 1/2005 | Leonhardt et al. | 101/484 |
| 6,886,264 B2 * | 5/2005 | Sakata et al. | 33/502 |
| 6,954,991 B2 * | 10/2005 | Akatsuka et al. | 33/550 |
| 7,464,482 B2 * | 12/2008 | Dall'Aglio et al. | 33/555.3 |
| 7,500,432 B2 | 3/2009 | Van Denend | |
| 2004/0114125 A1 | 6/2004 | Kaiser et al. | |
| 2005/0247219 A1 | 11/2005 | Giancaterino et al. | |
| 2006/0225594 A1 | 10/2006 | Thoma | 101/485 |
| 2008/0141886 A1 | 6/2008 | Whitelaw et al. | |
| 2010/0011978 A1 | 1/2010 | Whitelaw et al. | |

FOREIGN PATENT DOCUMENTS

| | | |
|---|---|---|
| DE | 19527199 A1 | 1/1997 |
| DE | 19755487 A1 | 6/1999 |
| DE | 199 49 951 A1 | 5/2001 |
| DE | 10357430 A1 | 7/2004 |
| DE | 20 2004 010442 | 11/2005 |
| EP | 0114957 A | 8/1984 |
| EP | 0393365 A | 10/1990 |
| EP | 1048461 A | 11/2000 |
| EP | 1249346 A | 10/2002 |
| JP | 04 148819 | 5/1992 |
| JP | 2006256175 A | 9/2006 |
| JP | 2006256176 A | 9/2006 |

* cited by examiner

ROTARY PRINTING PRESS AND METHOD FOR ADJUSTING A CYLINDER THEREOF

BACKGROUND OF THE INVENTION

The invention relates to a method of adjusting a roller in a rotary printing press.

The roller to be adjusted may for example be a printing cylinder or sleeve in a flexographic or gravure or offset printing press, or an anilox roller in a flexographic printing press. A parameter that will have to be adjusted for such a roller will be the force or pressure with which the peripheral surface of the roller is radially pressed against another member of the printing press, e.g. an impression cylinder or back pressure cylinder, if the roller to be adjusted is a printing cylinder, or a printing cylinder, if the roller to be adjusted is an anilox roller. This pressure parameter may be defined individually for the two opposite sides of the printing press which are called the drive side and the operating side. At least in case of a printing cylinder, parameters to be adjusted will typically also include the longitudinal register and the side register.

In a conventional printing press, the adjustment of these parameters is performed electronically by controlling suitable actuators or servo motors. Nevertheless, human intervention is still necessary for assessing the result of the adjustment operation by visually inspecting the printed image, and for entering commands to correct the settings. The adjustment operation is usually performed in a start-up phase of a print run, when a new roller or a new set of rollers has been mounted in the machine and the machine has been started to print images onto a web of a printing medium. As a result, a considerable amount of waste is produced until the adjustment operation has been accomplished and the quality of the printed images becomes satisfactory. In a modern high-speed printing press, the amount of waste that is produced in this way in the try-and-error type adjustment process may become as large as 600 m or more per print run. This implies not only a waste of web material but also a waste of time and hence a considerable reduction of the productivity of the printing press, especially when the print runs to be performed with a given set of rollers are relatively short.

Several attempts have been made to speed-up and automate the adjustment or setting of the rollers of a printing press in terms of longitudinal register, side register and also pressure. For example, EP 1 249 346 B1 describes a system and method for automated pressure setting, wherein the visual inspection of the printed images with the human eye is replaced by electronic image detection and feedback control of the pressure settings based on electronic image processing. Nevertheless, the adjustment procedure still requires a considerable amount of time and thus involves the production of waste.

SUMMARY OF THE INVENTION

It is an object of the invention to provide a method which permits to eliminate or at least reduce the production of waste and the amount of time needed for the adjustment process at the start of a print run.

According to a first aspect of the invention, this object is achieved by a method of adjusting a roller in a rotary printing press, comprising the steps of:
a) mounting the roller in a preparation rack so as to be rotatably supported therein,
b) scanning the peripheral surface of the roller, thereby to detect a topography of the roller surface,
c) deriving set data for the adjustment of the roller from the topography, and storing the set data,
d) mounting the roller in the printing press, and
e) adjusting the roller in accordance with the set data.

Thus, according to the invention, the try-and-error type adjustment process is replaced by a direct control of the adjustment parameters based on set data that have been established beforehand in a preparatory step outside of the printing press. As a result, when the roller is mounted in the printing press, it can immediately be adjusted on the basis of the set data prior to printing, so that an optimal quality of the printed image will be obtained from the outset, and the print process can start immediately without any waste of material and time.

More specific embodiments of the invention are indicated in the dependent claims.

In order to derive the set data for the adjustment operation, the roller is at first mounted in a preparation rack which may for example be a so-called mounter that is typically used for mounting printing plates on a printing cylinder or sleeve. In one embodiment, the roller is provided with a reference mark, so that, by detecting this reference mark when the roller is mounted in the preparation rack, it is possible to derive a reference for the axial and angular position of the roller and to precisely position the roller before the printing plates (in the case of a printing cylinder) are mounted thereon. Then, the topography of the surface of the roller is detected by scanning the peripheral surface of the roller with a scanning head which detects the shape of the roller surface or, more precisely, the surface of the printing plates, when the roller is a plate cylinder with printing plates mounted thereon. The topography data established in this way indicate the height of specific points on the surface of the roller, i.e. the radius or distance of the respective surface points from the axis of rotation of the roller. For example, the scanning head may employ laser triangulation or laser interferometry techniques for detecting the heights of the various surface points. These points are given in a co-ordinate system that is defined on the basis of the reference mark. Of course, it is possible to reverse the order of the steps and by first detecting the topography in a rack-related co-ordinate system that is then transformed into a roller-related co-ordinate system, after the reference mark has been detected.

The topography data may take the form of a map that assigns a specific height value to each point on the surface of the roller. Using laser triangulation or laser interferometry, it is possible to detect the height values with an accuracy of 1-2 μm, for example. Thus, the topography data may reflect not only the overall shape of the roller surface, including its eccentricity, conicity and crown, but may also reflect the distribution of elevated and depressed surface portions which, in case of a printing cylinder, for example, define the image information on the printing plate.

The topography data provide the necessary information for calculating the set data for an optimal setting or adjustment of the roller in the printing press.

For example, in case of a printing cylinder, the topography data indicates the exact location of the printing plates relative to the reference mark. Thus, when the reference mark is detected after the roller has been mounted in the printing press, it is possible to determine a set value for an axial position of the roller in the printing press, which axial position then gives the correct side register. Likewise, it is possible to derive a set value for an angular advance or delay of the roller in the direction of rotation, which delay or advance will give the correct longitudinal register. The same applies equivalently to other types of rollers which require a correct setting of the longitudinal and/or side register. If it is not necessary for a correct adjustment of the printing cylinder, that the entire topography of the cylinder is known, then, according to a modified aspect of the invention, the step of scanning may be replaced by a step of just determining the spatial relationship between the printing pattern and the reference mark.

On the other hand, in case of a printing cylinder or an anilox roller for flexographic printing, for example, the information on the overall geometrical shape of the roller surface, possibly in combination with the ratio between elevated (printing) and recessed (non-printing) surface portions, permits to derive a set value for the optimal pressure with which the roller is pressed against a co-operating part of the printing machine. This set value may for example be expressed as a force with which the roller is pressed against the co-operating part, a line pressure (force per length of the nip formed between the roller and the co-operating part) or else as a position of the axis of rotation of the roller along a predetermined axis along which the roller may be set against or withdrawn from the co-operating part. For example, the topography data permit to determine two values, one for each end of the roller, of the (smallest) radius of the roller, and these values may then be used for determining the optimal set positions. The optimal set value for the force or line pressure will of course depend upon a plurality of factors such as the elastic properties of the surface of the roller and the co-operating part, the composition of the ink, the properties of the printing medium, and the like. If the set value is defined as a set position, factors like the rigidity of the machine frame and the support structure for the roller may also be taken into account. For a given mounting site of the roller in the printing press, the influence of these factors on the optimal set value may, in advance, be determined experimentally in a calibration procedure resulting in a set of calibration data that may then be used in conjunction with the topography data of a specific roller for determining the optimal settings for that roller.

Thus, once the preparatory steps have been performed, the roller has been mounted in the printing press and the reference mark has been detected, it is possible to readily make the necessary adjustments for obtaining an optimal print quality, without any need for try-and-error procedures.

In one embodiment, the roller to be adjusted may be a printing cylinder or printing sleeve with printing plates mounted thereon. Then, when mounting the printing plates, a high accuracy is required only for the skew-free alignment of the printing plates with the axial direction of the roller, whereas the mounting positions of the plates in axial direction and circumferential direction of the roller are less critical. The position data relative to the position of the reference mark on the roller can be determined with high accuracy on the basis of the topography data that are detected in accordance with the invention, so that deviations in the axial or angular position of the plates can be compensated in the course of the setting of the side register and the longitudinal register within the printing press. In this way, the invention also facilitates the process of mounting the printing plates on the roller surface.

Further, the hardware needed for detecting the topography of the roller may conveniently be incorporated in a conventional mounter that is used for mounting the printing plates. In this aspect, the invention also features a mounter adapted to rotatably support a printing cylinder or sleeve, for mounting printing plates on the cylinder or sleeve, said mounter further including a detector for detecting a reference mark on the printing cylinder or sleeve, and a scanning system for measuring the three-dimensional shape of the surface of the printing plate or plates mounted on the cylinder or sleeve.

In another embodiment, the roller to be adjusted may be a printing cylinder or sleeve carrying a printing pattern that is formed directly on the surface of the cylinder or sleeve, e.g. by photolithographic techniques or, more preferably, by laser gravure. In the latter case, the laser system used for engraving the printing pattern will frequently include a laser detection system that provides a feedback signal for the engraving process. Then, this feedback signal may also be used for detecting the topography of the surface, so that the step of engraving the printing patterns and the step (b) of detecting the topography of the roller surface are integrated into a single step. In a modified embodiment, the laser system may be used not only for engraving the printing pattern but also for "machining" or giving a surface finish to the outer layer of the printing cylinder or sleeve as a whole, so that the entire topography of the roller surface will be determined by electronic data that control the laser gravure system. Then, these electronic data may be used as topography data in the meaning of the invention, without any need for "measuring" the surface shape of the roller.

Thus, according to another aspect of the invention, the method comprises the steps of:
  providing topograpy data that define a surface topography of the roller,
  mounting the roller in a preparation rack so as to be rotatably supported therein,
  machining the peripheral surface of the roller on the basis of the topography data, thereby to obtain a specific topography of the roller surface,
  deriving set data for the adjustment of the roller from the topography data, and storing the set data,
  mounting the roller in the printing press, and
  adjusting the roller in accordance with the set data.

Under this aspect, the invention approaches a concept of "digital printing" with a rotary printing press, in the sense that it is only necessary to provide digital data that define the printed image, and these data are then used for machining the printing cylinder so as to obtain the desired printing pattern and are also used for automatically setting the printing cylinder in the printing press, so that, except for the step of mounting the printing cylinder in the printing press, no human intervention is necessary in the entire process chain from compiling the digital print data up to the final printed product.

The methods according to the invention may be applied not only in case of a flexographic printing cylinder or sleeve but also in case of a gravure printing cylinder or an offset printing cylinder. In case of a gravure printing cylinder, the set data will primarily relate to the geometrical shape of the cylinder surface and/or the longitudinal register, side register and colour register. In case of an offset printing cylinder, the set data may relate only to the longitudinal register and side register.

Further, the roller to be adjusted may be an anilox roller in a flexographic printing press. Then, it may be sufficient to detect the topography so as to determine the diameter and/or geometrical shape of the roller, and it may not be necessary to provide a reference mark on the roller.

It should also be noted that, in general, the topography data of one roller (or other relevant data related to that roller) may be utilised for adjusting another roller that co-operates with said one roller. For example, the data established for a flexographic printing cylinder may influence the adjustment of an associated anilox roller, and vice versa, and the data established for a gravure printing cylinder may be used for adjusting a pressure with which a back-pressure cylinder is pressed against that printing cylinder.

Any suitable type of communication system may be used for transmitting the data that are gathered in the preparation rack to the printing press where the roller is to be mounted. For example, the communication may be performed via a cable that is connected to the preparation rack and is plugged to the control circuitry for the adjustment actuators and servomotors associated with the site in the printing press where the roller is to be mounted. As an alternative, wireless communication, e.g. via Bluetooth or the like, may be used. In this case, the operator has to specify the destination where the roller is to be mounted. The preparation rack may also be installed remote from the printing press, and the communication may be achieved via a local area network (LAN) or a wide area network (WAN).

In a particularly preferred embodiment, however, the communication is based on RFID technology. Then, an RFID chip is incorporated in the roller, and the mounting rack comprises a write head for writing the pertinent data into the RFID chip on the roller. Correspondingly, each mounting site in the printing press includes a read head which is capable of reading the data from the RFID chip when the roller is mounted in the printing press.

The set data that are derived in the scanning step and are written into the RFID chip may be raw data that include, for example, an angular and an axial offset of the printing pattern relative to the reference mark, data specifying the overall geometrical shape of the roller surface, e.g. its eccentricity and conicity, and data specifying the average image density of the image to be printed (e.g. the ratio between the printing and non-printing parts of the printing pattern averaged over a suitable portion of the roller surface). These raw data are not yet calibrated for a specific mounting site in the printing press and a specific print run. When the roller is mounted in a specific mounting site in the printing press, and the data are read from the RFID chip, the control circuitry of that mounting site will merge the data with pre-established calibration data to determine the final set data for adjusting the roller.

The RFID chip may also store relevant rigidity or resiliency properties of the roller, e.g. a hardness of a rubber or polymer layer of the roller, preferably differentiated for the drive side and the operating side of the printing press.

Various encoding and detecting techniques may be used for forming and detecting the reference mark. For example, the reference mark may be formed by a permanent magnet, and 3-axes hall sensors may be used for detecting the reference mark in the preparation rack and in the printing press, respectively. In general, it would be sufficient to detect the position of the reference mark in only two dimensions, i.e. in the direction of the axis of the roller and in the circumferential direction. However, a measurement along the third axis (height) is useful for improving the accuracy of the detection in the other two dimensions. Then, the 3-axes sensor will be used to triangulate the position of the reference mark in three dimensions and to establish the exact offset of the reference mark and to provide instantaneous correction commands irrespective of the distance of the sensor.

As an alternative, when the roller has at least one non-metallic layer, e.g. a polymeric layer, the reference mark may be formed by a block of metal, and detection may be achieved by inductive measurement, preferably again along three axes. If a roller, e.g. a gravure printing cylinder, mainly consists of metal, the reference mark may also be formed by a recess or cavity in the metal of the roller, so that the position of the reference mark may again be detected inductively.

The reference mark may be positioned at one end of the roller in a region of a margin of the web that is not printed upon. However, the reference mark may also be covered by a layer carrying the printing pattern.

The RFID chip may be embedded in the roller in a similar way. When the operating frequency of the RFID is selected appropriately, the chip may even be covered by a metal layer.

Since the invention offers the possibility to adjust the rollers involved in a printing process on a rotary printing press in an extremely short time, it permits to eliminate the production of waste almost completely. A particularly useful application of the invention is the change of a print job "on the fly". That means that, for example, when a printing press has ten colour decks of which only five are used for a running print job, the remaining five colour decks can be prepared for the next job by mounting suitable rollers, while the printing press is running. In this context, it should be noted that so-called access systems have been developed which permit to safely access the printing cylinders, anilox rollers and the like of a printing press and to exchange the same while the machine is running. When the new rollers have been mounted, the set data are read from the pertinent RFID chips, the side register and the longitudinal register are adjusted while the rollers are at standstill and are still shifted away from the web, and then a simple command is sufficient to lift-off the printing cylinders that have heretofore been operative and to shift the printing cylinders of the five new colour decks to the pre-calculated set positions, so that images of the new job will instantaneously be printed onto the running web in good quality.

Another useful application of the invention is the printing of so-called "promotion" in the packaging industry. When packaging material for commercial goods is being printed, the printed image on the package typically consists of a number of static elements which remain unchanged and are therefore printed in relatively long print runs and in correspondingly large numbers. However, these printed images may also include certain elements that are called "promotion" and that are used only for specific editions and are therefore needed only in relatively small numbers. In this context, the invention offers the possibility to print packaging material bearing different promotion items in a single, relatively long print run and to change on the fly from one promotion item to the other.

Although the methods according to the invention, as described above, aim primarily at avoiding the production of waste, these methods are also useful in a case where the production of waste cannot be eliminated completely, but a certain amount of fine-adjustment is still required in the start-up phase of the print run. Then, the adjusting procedures according to the invention will at least shorten the time required for the try-and-error-type fine-adjustment process and will thus reduce the production of waste. In this case, it may be preferable that information relating to the fine-adjustments that have been made after the print run has started are fed back to the roller and are stored on the RFID chip, so that the experiences that have been gathered during the start-up phase of the first print run are available on the chip and can be utilised in the next print run for further improving and shortening the adjusting process.

According to a specific embodiment of the invention, when an RFID chip on the roller is used, this RFID chip may at the same time form the reference mark. To that end, the RFID chip may comprise a component that can be detected by means of a magnetic sensor, an induction sensor or the like, or the radio frequency signal re-transmitted from the chip may be utilised for detecting the position of the chip with high accuracy.

While, according to the first aspect of the invention, the peripheral surface of the roller is scanned when the roller is mounted on a preparation rack or mounter, it is possible according to a third aspect of the invention that the peripheral surface of the roller is scanned after the roller has been mounted in the printing press but before the print run has started. The topography data or the set data derived therefrom may nevertheless be stored on a chip on the roller, so that they are readily available for the next print run.

It may even be considered to combine the second and the third aspect of the invention, i.e. to incorporate the laser gravure device in the colour deck of the printing press and to form the printing pattern in-situ, after the printing cylinder has been mounted in the colour deck. Then, ideally, one would end up with a "digital" rotary printing press, wherein, in order to start a print job, it is sufficient to supply the print data to the machine and to press a start button, and the process of forming the printing pattern, adjusting the rollers and printing will be performed automatically by the machine. When a new print job is to be started, the laser gravure equipment may be used to erase the former printing pattern and to engrave a new printing pattern in the surface of the printing cylinder, so that several print jobs can be made without having to exchange the printing cylinders. Of course, the diameter of the printing cylinder will gradually be decreased by repeated erase and pattern forming cycles, so that it will be necessary to replace the printing cylinder or a sleeve thereof from time to time.

On the other hand, when the process of scanning the peripheral surface of the roller is performed within the printing press (with or without formation of the printing pattern in case of a printing cylinder), the scan process may be continued even when the print run has started, so as to improve and accelerate the fine-adjustment of the roller. This approach has the particular advantage that it is possible to detect not only the geometrical shape of the roller surface and the printing pattern formed thereon, but also the exact position of the axis of rotation of the roller relative to other components of the printing press, including other rollers, such as the central impression cylinder. In this way, errors that may result from any play in the roller bearings, from the rigidity of the machine frame, and the like can readily be compensated. This concept is particularly powerful because, when the scanning process is performed or continued while the printing press is running and, hence, the bearings and the machine frame are subject to forces with which the various rollers are pressed against one another, any distortions caused by these forces can be detected and compensated in real-time. This applies not only to printing cylinders but also to anilox rollers or to back pressure cylinders in the case of gravure printing, and the like. It may even be possible to scan the surface of the central impression cylinder so as to detect the exact position of the axis of rotation thereof.

According to a further development of this approach, the central impression cylinder may also include active elements that can be used to control the exact shape of the peripheral surface of the central impression cylinder. Then, for example, if it is found that the peripheral surface of a printing cylinder has a curtain crown or, more generally, a diameter that varies over the length of the cylinder, the active elements may be used to modify the shape of the peripheral surface of the central impression cylinder so as to achieve a perfect match of the surfaces at the nip formed between these cylinders. The relevant control parameters for the active elements in the central impression cylinder may again be stored on the chip of the printing cylinder, so that the appropriate settings of the active elements may be re-established when the same printing cylinder is used next time.

In a conventional printing press, the peripheral surface of the central impression cylinder is temperature-controlled by means of water that circulates in a jacket of the cylinder. Then, the crown of the central impression cylinder may be modified by controlling the temperature of the water in the jacket and thus controlling the thermal expansion. The water jacket may also be segmented over the length of the central impression cylinder, so that the temperature and the thermal expansion may be controlled individually for each segment. As an alternative, the peripheral wall of the central impression cylinder may also be equipped with a heater or a plurality of heater segments which directly control the temperature and the thermal expansion of the wall.

BRIEF DESCRIPTION OF THE DRAWINGS

Preferred embodiments of the invention will now be described in conjunction with the drawings, wherein.

DETAILED DESCRIPTION

Figure 1:
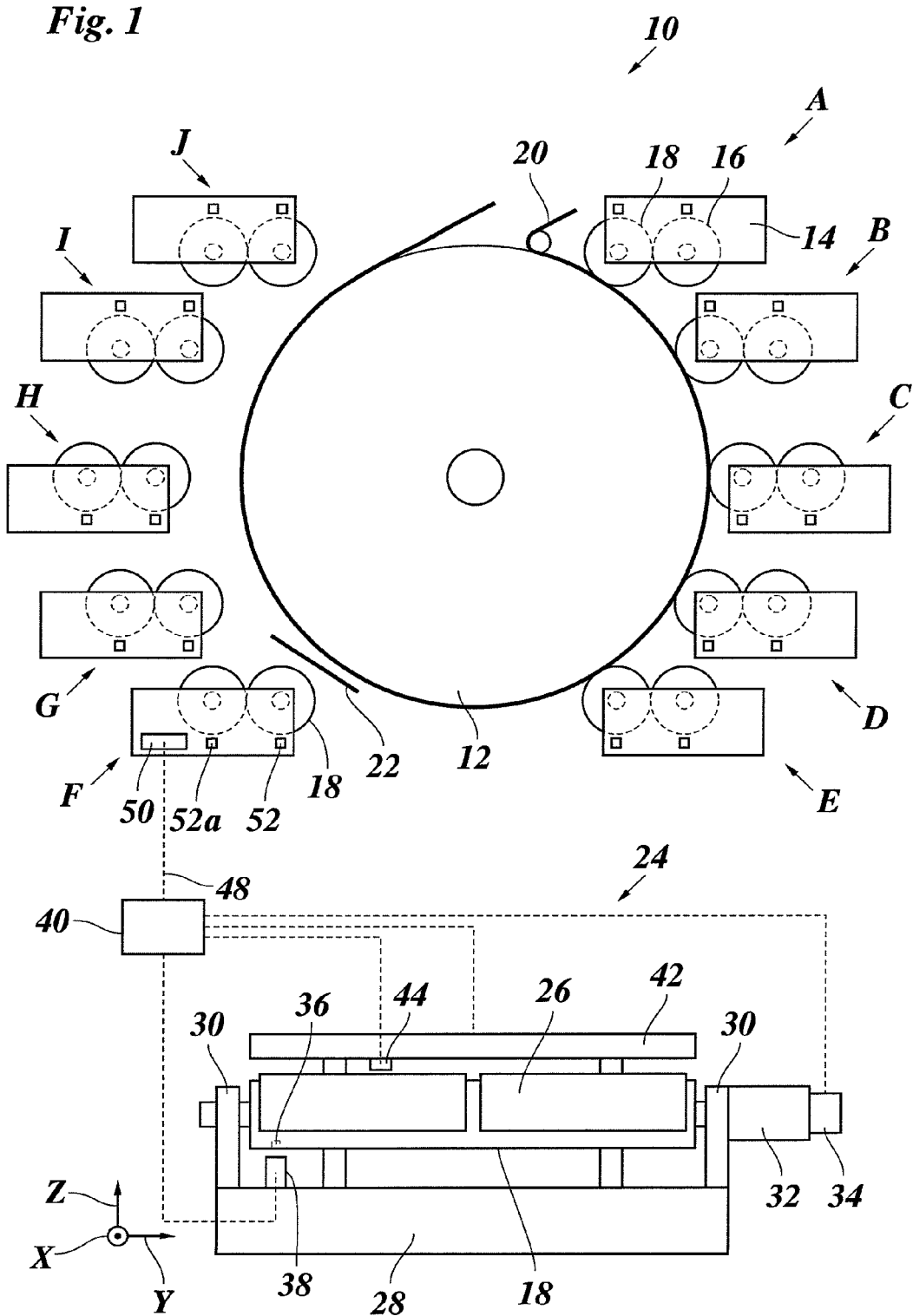
FIG. 1 is a schematic view of a rotary printing press and an associated preparation rack.

As an example of a printing press to which the invention is applicable, FIG. 1 shows a known flexographic printing press having a central impression cylinder (CI) 12 and ten colour decks A-J arranged around the periphery thereof. Each colour deck comprises a frame 14 which rotatably and adjustably supports an anilox roller 16 and a printing cylinder 18. As is generally known in the art, the anilox roller 16 is inked by means of an ink fountain and/or a doctor blade chamber (not shown) and may be adjusted against the printing cylinder 18, so that the ink is transferred onto the peripheral surface of the printing cylinder 18 carrying a printing pattern.

A web 20 of a print substrate is passed around the periphery of the CI 12 and thus moves past each of the colour decks A-J when the CI rotates.

In FIG. 1, the colour decks A-E are shown in the operative state. In this state, the anilox rollers 16 and the printing cylinders 18 are driven to rotate with a peripheral speed that is identical with that of the CI 12, and the printing cylinder 18 is adjusted against the web 20 on the peripheral surface of the CI 12, so that an image corresponding to the respective printing pattern is printed onto the web 20. Each of the colour decks A-E operates with a specific type of ink, so that corresponding colour separation images of a printed image are superposed on the web 20 when it passes through the nips formed between the CI 12 and the various printing cylinders 18 of the successive colour decks. It is a specific advantage of a printing press with a CI-architecture as shown in FIG. 1, that the colour separation images formed by the various colour decks can reliably be held in registry, because the web is stably supported on a single element, i.e. the CI 12.

In the condition shown in FIG. 1, the other five colour decks F-J are not operating, and their printing cylinders are shifted away from the web 20. While the machine is running, these colour decks F-J may be prepared for a subsequent print job by exchanging the printing cylinders 18 and, as the case may be, also the anilox rollers 16. As has been exemplified for the colour deck F in FIG. 1, a protective shield 22 has been moved into a position between the CI 12 and the printing cylinder 18 of that colour deck, and additional protective covers (not shown) are fixed on the sides of the machine, so that operating personnel may access the colour deck F to exchange the printing cylinder without any risk of injury or damage that might be caused by direct contact with the rotating CI 12. Although not shown in the drawing, similar protective shields are also provided for each of the other colour decks.

FIG. 1 further shows a schematic front view of a so-called mounter, i.e. a rack that is used for preparing a printing cylinder 18 before the same is mounted in one of the colour decks, e.g., the colour deck F. In the example shown, it is assumed that the printing cylinder 18 is of a type carrying one or more printing plates 26 carrying a printing pattern on their outer peripheral surface. The mounter 24 is particularly used for mounting the printing plates 26 on the printing cylinder 18, e.g. by means of an adhesive.

The mounter 24 has a base 28 and two releasable bearings 30 in which the opposite ends of the printing cylinder 18 are rotatably supported. As an alternative, the mounter may have one releasable bearing and a fixed base that extends to enable diameter changes of different size mounting mandrels. A drive motor 32 is arranged to be coupled to the printing cylinder 18 to rotate the same, and an encoder 34 is coupled to the drive motor 32 for detecting the angular position of the printing cylinder 18.

A reference mark 36, e.g. a magnet, is embedded in the periphery of the printing cylinder 18, and a detector 38 capable of detecting the reference mark 36 is mounted on the base 28 in a position corresponding to the axial position of the reference mark. The detector 38 may for example be a 3-axes hall detector capable of accurately measuring the position of the reference mark 36 in a 3-dimensional co-ordinate system having axes X (normal to the plane of the drawing in FIG. 1), Y (in parallel with the axis of rotation of the printing cylinder 18) and Z (vertical in FIG. 1).

When the printing cylinder 18 is rotated into the position shown in FIG. 1, where the reference mark 36 faces the detector 38, the detector 38 measures an offset of the reference mark 36 relative to the detector 38 in Y-direction as well as an offset in X-direction. This offset in X-direction is determined by the angular position of the printing cylinder 18. Thus, even when the reference mark 36 is not exactly aligned with the detector 38, it is possible to derive a well defined Y-position and a well defined angular ($\phi$) position which may serve as a reference point for defining a cylindrical $\phi$-Y-R co-ordinate system that is fixed relative to the printing cylinder 18 (the R-co-ordinate being the distance of a point from the axis of rotation of the printing cylinder, as defined by the bearings 30). The position data defining this reference point are stored in a control unit 40 of the mounter 24.

It is observed that the Z-co-ordinate of the reference mark 36, as measured by the detector 38, is not needed in the further processing steps but serves to remove any ambiguities or errors involved in the detection signals that indicate the X- and Y-positions of the reference mark 36.

The mounter 24 further comprises a rail 42 that is fixedly mounted on the base 28 and extends along the outer surface of the printing cylinder 18 in Y-direction. A laser head 44 is guided on the rail 42 and may be driven to move back and forth along the rail 42 so as to scan the surface of the printing cylinder 18 and, in particular, the surfaces of the printing plates 26. The rail 42 further includes a linear encoder which detects the Y-position of the laser head 44 and signals the same to the control unit 40. When the printing cylinder 18 is rotated, the encoder 34 counts the angular increments and signals them to the control unit 40, so that the control unit 40 can always determine $\phi$ and Y-co-ordinates of the laser head 44 in the cylindrical co-ordinate system that is linked to the reference mark 36 of the printing cylinder.

The laser head 44 uses laser triangulation and/or laser interferometry techniques for measuring the height of the surface point of the printing cylinder 18 (or printing plate 26) that is located directly underneath the current position of the laser head. The height determined in this way can be represented by the R-co-ordinate in the cylindrical co-ordinate system. Thus, by rotating the printing cylinder 18 and moving the laser head 44 along the rail 42, it is possible to scan the entire peripheral surface of the printing cylinder 18 and to capture a height profile or topography of that surface with an accuracy that may be as high as 1-2 µm, for example. To this end, the y-axis of the mounter may be calibrated to map inherent deviations of the rail 42, which will then be combined in the control unit 40 with the readings from the laser head 44 so as to establish a more accurate topography.

In this way, the exact geometrical shape of the printing cylinder 18 (including the printing plates) can be determined with high accuracy in the control unit 40. In particular, it is possible to detect whether the surface of the printing cylinder has a circular or rather a slightly elliptic cross-section. If the cylinder is found to have an elliptic cross section, the azimuth angle of the large axis of the ellipse can be determined. Likewise, even if the cross section of the surface of the printing cylinder is a perfect circle, it is possible to detect whether the centre of this circle coincides with the axis of rotation that is defined by the bearings 30. If this is not the case, the amount of the offset and its angular direction can also be detected and recorded. In principle, all this can be done for any Y-position along the printing cylinder 18. Moreover, it is possible to detect whether the diameter of the printing cylinder 18 varies in Y-direction. For example, it can be detected whether the printing cylinder has a certain conicity, i.e., whether its diameter slightly increases from one end to the other. Similarly, it can be detected whether the printing cylinder bulges outwardly (positive crown) or inwardly (negative crown) in the central portion. In summary, it is possible to gather a number of parameters that indicate the average diameter of the printing cylinder 18 as well as any possible deviations of the shape of the peripheral surface of the printing cylinder from a perfect cylindrical shape.

In addition to this, the laser head 44 is also capable of detecting the borders of the printing plates 26 and also of "reading" the printing pattern that is defined by elevated (printing) and depressed (non-printing) portions on the surface of the printing plates 26.

When the printing plates 26 are applied to the printing cylinder 18 and fixed thereon, the topography data gathered by the laser head 44 may optionally be used for checking and possibly correcting any skew in the position of the printing plates 26 relative to the Y-axis, so that it is possible to mount the printing plates 26 in perfectly aligned positions.

On the other hand, considerable mounting tolerances are allowed for the Y- and φ-positions of the printing plates 26, even though these positions have an impact on the side register and the longitudinal register of the image to be printed. The reason is that any possible deviations from target positions can be detected with high accuracy by means of the laser head 44 and can be compensated at a later stage, when the printing cylinder is mounted in the printing press 10.

When the printing cylinder 18 has been scanned in the mounter 24, it is removed from the mounter so that it may be inserted in one of the colour decks of the printing press 10. When, for example, the printing cylinder that has been removed from the mounter 28 is to replace the printing cylinder in the colour deck F, the topography data detected by means of the laser head 44 and stored in the control unit 40 are transmitted through any suitable communication channel 48 to an adjustment control unit 50 of that colour deck.

As is further shown in FIG. 1, each colour deck comprises a detector 52 for detecting the reference mark 36 of the printing cylinder mounted in that colour deck. Thus, by detecting the position of the reference mark 36 with the detector 52 after the printing cylinder has been mounted in the colour deck F, it is possible to transform the topography data obtained from the mounter 24 into a local co-ordinate system of the colour deck. Then, the position of the printing cylinder 18 in the colour deck F may be adjusted on the basis of these data, as will now be explained in conjunction with FIG. 2.

Figure 2:
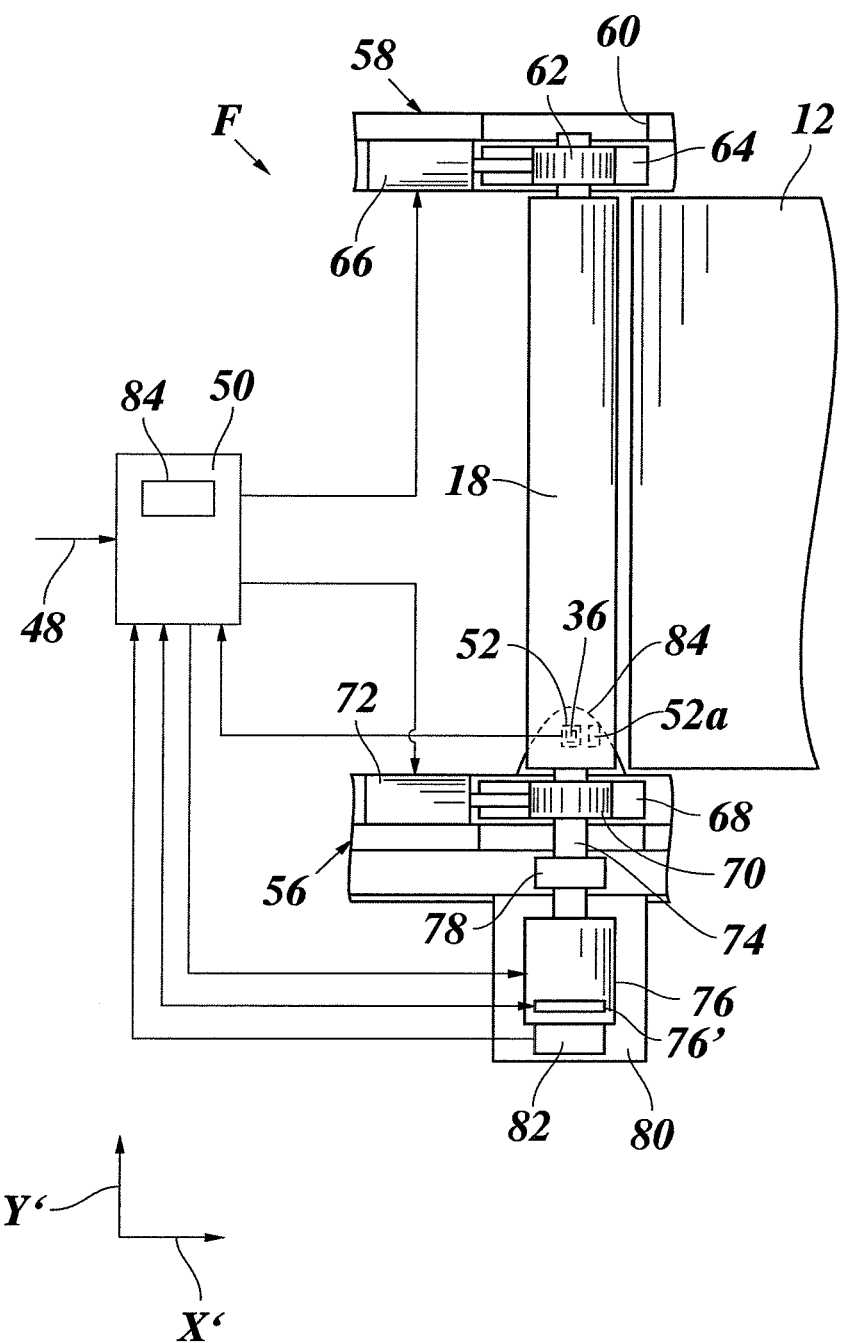
FIG. 2 is a schematic horizontal cross-section showing essential parts of an individual colour deck in the printing press shown in FIG. 1.

FIG. 2 shows only a peripheral portion of the CI 12 as well as certain portions of the colour deck F which serve to rotatably and adjustably support the printing cylinder 18. These portions of the colour deck comprise stationary frame members 56, 58 on the drive side and the operating side of the printing press 10, respectively. The frame member 58 on the operating side has a window 60 through which, when the printing cylinder is to be exchanged, the old printing cylinder is removed and the new one is inserted. In practice, rather than exchanging the printing cylinder 18 in its entirety, it may be convenient to exchange only a printing cylinder sleeve that is air-mounted on a cylinder core, as is well known in the art.

The frame member 58 carries a releasable and removable bearing 62 that supports one end of the printing cylinder 18. This bearing 62 is slidable towards and away from the CI 12 along a guide rail 64, and a servo motor or actuator 66 is provided for moving the bearing 62 along the guide rail 64 in a controlled manner.

The frame member 56 on the drive side of the printing press has a similar construction and forms a guide rail 68 and supports a bearing 70 and a servo motor or actuator 72. Here, however, an axle 74 of the printing cylinder extends through a window of the frame member 56 and is connected to an output shaft of a drive motor 76 through a coupling 78. The drive motor 76 is mounted on a bracket 80 that is slidable along the frame member 56, so that the drive motor may follow the movement of the bearing 70 under the control of the actuator 72. Thus, the position of the printing cylinder 18 relative to the CI 12 along an axis X' (defined by the guide rails 64, 68) may be adjusted individually for either side of the printing cylinder. In this way, it is possible to set the pressure with which the printing cylinder 18 presses against the web on the CI 12 and also to compensate for a possible conicity of the printing cylinder.

The axle 74 of the printing cylinder 18 is axially slidable in the bearings 62, 70 (in the direction of an axis Y'), and the drive motor 76 has an integrated side register actuator 76' for shifting the printing cylinder in the direction of the axis Y'.

Further, the drive motor 76 includes an encoder 82 for monitoring the angular position of the printing cylinder 18 with high accuracy.

The detector 52 which may have a similar construction as the detector 38 in the mounter 24 is mounted on a bracket 84 that projects from the frame member 56. Thus, the detector 52 is held in such a position that it may face the reference mark 36 on the printing cylinder and may be retractable, so that its position can be adapted to different cylinder sizes. As an alternative, the detector 52 may be arranged to be movable in the direction Y' into a fixed position in the path of travel of the printing cylinder 18. The printing cylinder will then be moved along the axis X' by an amount depending on its diameter, until the detector can read the reference mark. The detector is then moved back so as to avoid collision with the printing cylinder, and the cylinder finally moves to the print position. In his case, the detector needs only to be moved between two positions, one for measuring and one for standby. It can therefore be moved by a pneumatic cylinder or some simple positioning means.

Other possible mounting locations for the detector 52 (and an RFID read/write head 52a to be described later) are the space between the printing cylinder and the CI or, preferably, between the printing cylinder and the anilox roller. This permits a stationary mounting of the detector or at least a reduction of the length of the path along which the detector is shifted between the positions for measuring and for standby. Possibly, the drive system that is provided for adjusting the side register may be used for effecting this shift movement.

When the printing cylinder 18 is mounted in the colour deck F, the drive motor 76 is held at rest in a predetermined home position, and the coupling 78 may comprise a conventional notch and cam mechanism (not shown) which assures that the reference mark 36 will roughly be aligned with the detector 52. Then, the precise offset of the reference mark 36 relative to the detector 52 in Y'-direction and the precise angular offset are measured in the same way as has been described in conjunction with the detector 38 of the mounter. The measured offset data are supplied to the adjustment control unit 50 which also receives data from the encoder 82 and the side register actuator 76'. These data permit to determine the angular position and the Y'-position of the printing cylinder 18 in a machine co-ordinate system.

By reference to the topography data delivered via the communication channel 48 and by reference to the Y' position provided by the side register actuator 76' and the offset data provided by the detector 52, the control unit 50 calculates the Y' position of the printing pattern on the printing plates 26 in the machine co-ordinate system and then controls the actuator 76' to precisely adjust the side register.

Then, before a print run with the new printing cylinder 18 starts, the drive motor 76 is driven to rotate the printing cylinder 18 with a peripheral speed equal to that of the CI 12, and the angular positions of the printing cylinder 18 are monitored on the basis of the data supplied by the encoder 82. By reference to the topography data and the offset data from the detector 52, the control unit 50 calculates the actual angular positions of the printing pattern on the printing plates 26 and advances or delays the drive motor 76, thereby to adjust the longitudinal register.

The control unit 50 further includes a memory 84 which stores calibration data. These calibration data include, for example, the X' position of the CI 12 at the nip with the printing cylinder 18, the rigidity of the bearing structure for the printing cylinder 18, the properties of the web 20 and the ink to be employed in the print run to start, and the like. Since the X'-direction defined by the guide rails 64, 68 is not necessarily normal to the surface of the CI 12 at the nip formed with the printing cylinder 18, the calibration data may also include the angle formed between the normal on the surface of the CI and the X'-direction.

Based on the properties of the ink and the properties of the web 20 and on the topography data relating to the average optical density of the image to be printed, it is possible to determine a target line pressure with which the printing cylinder 18 should be pressed against the web. Then, based on the topography data that specifies the geometrical shape of the print surface defined by printing cylinder 18 and based on the above-mentioned calibration data, it is possible to determine target values for the X'-positions to which the actuators 66 and 72 shall be set in order to obtain an optimal line pressure. Then, upon a command to start printing with the colour deck F, the control unit 50 controls the actuators 66 and 62 to adjust the printing cylinder 18 to the appropriate print position.

It will be understood that the adjusting mechanisms described in conjunction with FIG. 2 are provided for the printing cylinders 18 of each of the colour decks A-J.

Further, although not shown in the drawings, adjustment mechanisms with an analogous construction are provided for each of the anilox rollers 16, and procedures similar to the ones described above are employed for appropriately adjusting the anilox rollers, especially in terms of line pressure between the anilox roller and the printing cylinder.

Figure 3:
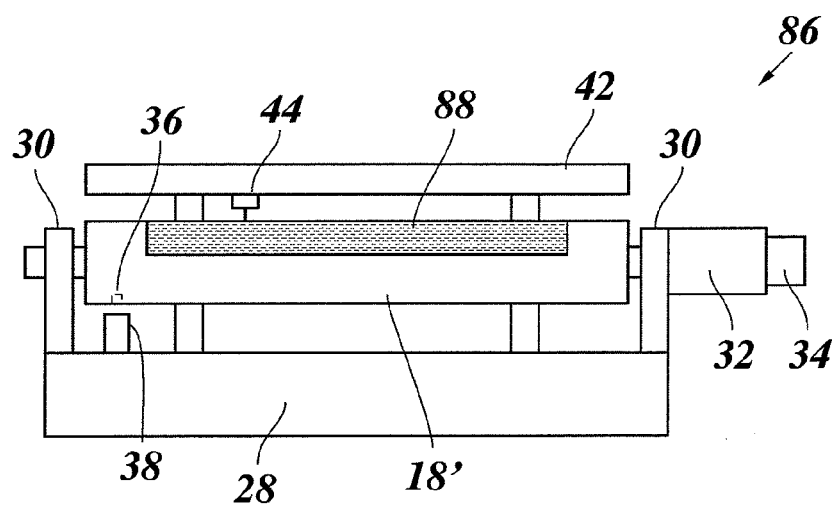
FIG. 3 shows a preparation rack according to a modified embodiment of the invention.

FIG. 3 shows a schematic front view of a preparation rack 86 that is used in place of the mounter 24 in a modified embodiment of the invention. In this embodiment, the printing cylinder 18' is of a type that is not intended for mounting printing plates thereon, but, instead, a printing pattern 88 is formed directly in the surface of an outer peripheral polymer layer of the printing cylinder itself by means of a laser gravure system.

The overall construction of the rack 86 is similar to that of the mounter 24, with the main difference that the laser head 44 forms part of the laser gravure system and is adapted to form the printing pattern 88 and to detect the topography of the printing cylinder by confirming the result of the gravure process. Optionally, the gravure process and the confirmation of the result may be performed in one and the same scan cycle of the laser head 44, possibly with the use of a multiple-beam laser head. Of course, the gravure process is controlled by programming data which define the printing pattern 88 in the φ-Y-R-co-ordinate system that uses the reference mark 36 as a reference. Consequently, according to another option, the programming data defining the printing pattern 88 may directly be incorporated in the topography data that are transmitted to the adjustment control unit 50 of the colour deck in the printing press.

Figure 4:
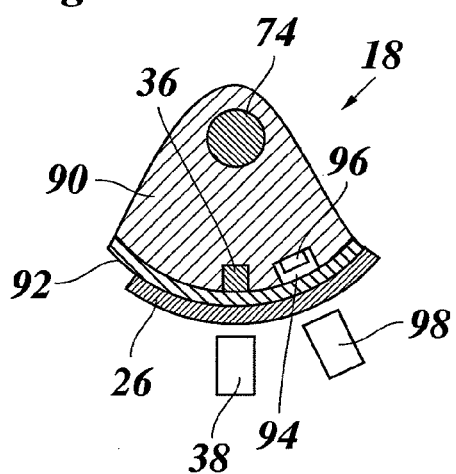
FIGS. 4-7 are partial cross-sections of printing cylinders employed in different embodiments of the invention.

FIG. 4 shows a partial cross section of a printing cylinder 18 that is used in the embodiment shown in FIG. 1. The printing cylinder 18 comprises a sleeve 90 that is mounted on the axle 74 and may, for example, mainly consist of carbon fibres. A polymer layer 92 is formed on the outer peripheral surface of the sleeve 90. The printing plates 26 are mounted on the outer peripheral surface of the layer 92.

In the example shown, the reference mark 36 is formed by a magnet that is embedded in the carbon sleeve 90 and covered by the layer 92 and the printing plate 26. Optionally, the magnet may also be embedded in the layer 92. In any case, the magnet forming the reference mark 36 is arranged in such a manner that the magnetic field thereof penetrates the printing plate 26 and can be detected by the detector 38 and also by the detector 52 in the printing press.

The sleeve 90 further forms a recess 94 that is covered by the layer 92 and accommodates an RFID chip 96. The recess 94 is formed in the same axial position as the reference mark 36 but is angularly offset therefrom.

The mounter 24 comprises a write head 98 that is arranged to oppose the RFID chip 96 when the detector 38 opposes the reference mark 36. The write head is used for writing the offset data detected by the detector 38 and the topography data detected by the laser head 44 into the RFID chip 96 and thus forms part of the communication channel 48 shown in FIG. 1. This communication channel further includes a read head or read/write head 52a (FIG. 2) that is arranged adjacent to the detector 52 in the colour deck of the printing press for reading the data from the RFID chip 96. Preferably, the data are read from the RFID chip 96 during the time when the detector 52 in the printing press detects the position of the reference mark 36.

The RFID chip may also store additional data relating to, for example, rigidity properties of the printing cylinder. Further, the read/write head 52a may be used for writing data, e.g. feedback data, onto the RFID chip. For example, if it turns out that the settings adjusted in accordance with the method of the invention do not give an optimal result, and the settings are therefore corrected manually, the corrections may be stored on the chip, so that they are readily available when the same printing cylinder is used next time. As an alternative, the corrections may form part of the calibration data and may be stored in a memory that is assigned to the colour deck of the machine The anilox roller 16 may have a similar construction as the printing cylinder 18, including an RFID chip 96, but no reference mark 36. Instead of the polymer layer 92, there will be provided a ceramic layer, for example, which forms a pattern of ink receiving cells of the anilox roller. For scanning the surface of the anilox roller and sampling the topography data, the anilox roller may be mounted in the mounter 24, so that the surface can be scanned with the laser head 44. As another option, the RFID chip may be programmed already in the manufacturing process for the anilox roller and may include such data as cell count angle and cell volume, all which are transferred to the printing machine and displayed for operator information and possible offset adjustments to the calculated printing position with respect to the impression adjustment.

Figure 5:
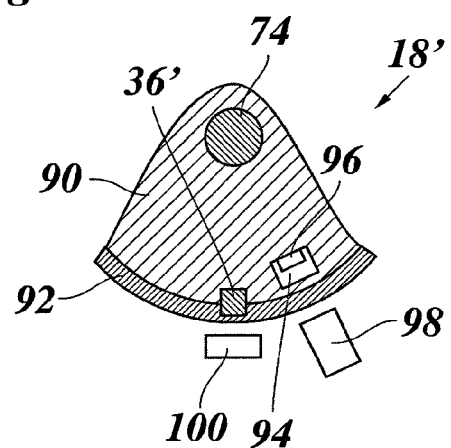

FIG. 5 shows the printing cylinder 18' that is used in the embodiment shown in FIG. 3, wherein the printing pattern is formed directly in the surface of the polymer layer 92. In this example, the reference mark is formed by a metal block 36' that is embedded in the sleeve 90 and possibly a part of the polymer layer 92 but still covered by an outer portion of the polymer layer. A 3-axes inductive position detector 100 is used for detecting the position of the metal block 36' serving as a reference mark.

Figure 6:
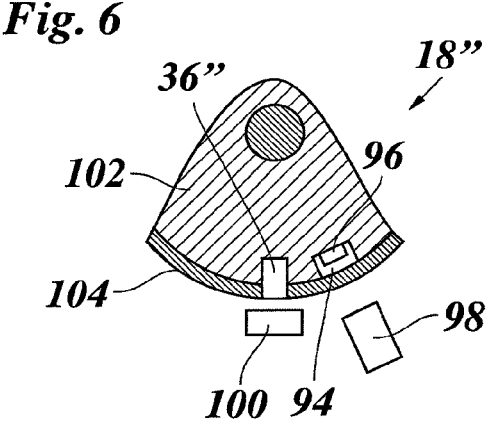

FIG. 6 shows a gravure printing cylinder 18" having a metal body 102 and an outer steel layer 104 in the surface of which the printing pattern is formed. The reference mark is formed by a cavity 36" that is formed in the body 102 and the steel layer 104. Thus, the position of the reference mark can a-gain be detected by means of the inductive position detector 100. This position detector as well as the write head 98 may in this case be incorporated in a gravure machine that is used for forming the printing pattern on the steel layer 104. Likewise, the scanning system including the laser head 44 will be incorporated in this gravure apparatus. Since the cavity 94 accommodating the RFID chip 96 is covered by the steel layer 104, the radio signals transmitted and received by the RFID chip have such a frequency that they are capable of penetrating the steel layer 104. It will be understood that the gravure printing cylinder 18″ shown in FIG. 6 is to be mounted in a gravure printing press having colour decks that are equipped with detectors and RFID read heads for detecting the reference mark and the topography data similarly as in the embodiments described above.

Figure 7:
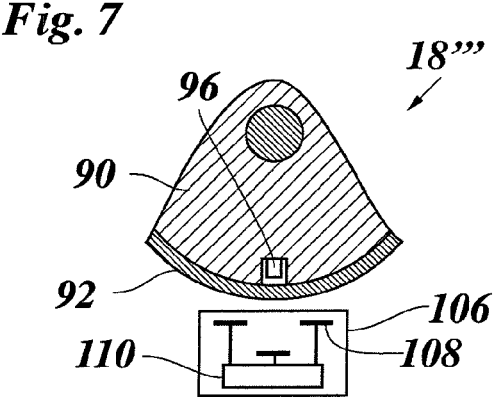

FIG. 7 shows a printing cylinder 18‴ which has the same general construction as the one shown in FIG. 5, but wherein the RFID chip 96 serves at the same time as a reference mark. Correspondingly, a write and detection head 106 of the mounter or preparation rack 86 is adapted to not only write data onto the RFID chip 96, but also to detect the exact position of the chip 96 serving as a reference mark. To that end, the write and detection head 106 may be equipped with a plurality of antenna elements 108 and a detection circuit 110 which detects the position of the chip on the basis of the radio signals transmitted therefrom, e.g. by interferometric methods.

Of course, a read/write and detection head analogous to the head 106 will also be provided in the colour deck of the printing press. Depending on the read, write, and detection algorithms employed, it may also be possible to read and write data and/or to perform the reference mark detection with the head in the preparation rack and/or the colour deck while the roller is rotating. Continued or repeated detection of the reference mark in the printing press has the benefit that any possible drift in the longitudinal register and the side register may be detected and corrected while the printing press is running.

Of course, this technology may also be employed for the printing cylinder with printing plates mounted thereon, as shown in FIG. 4.

Figure 8:
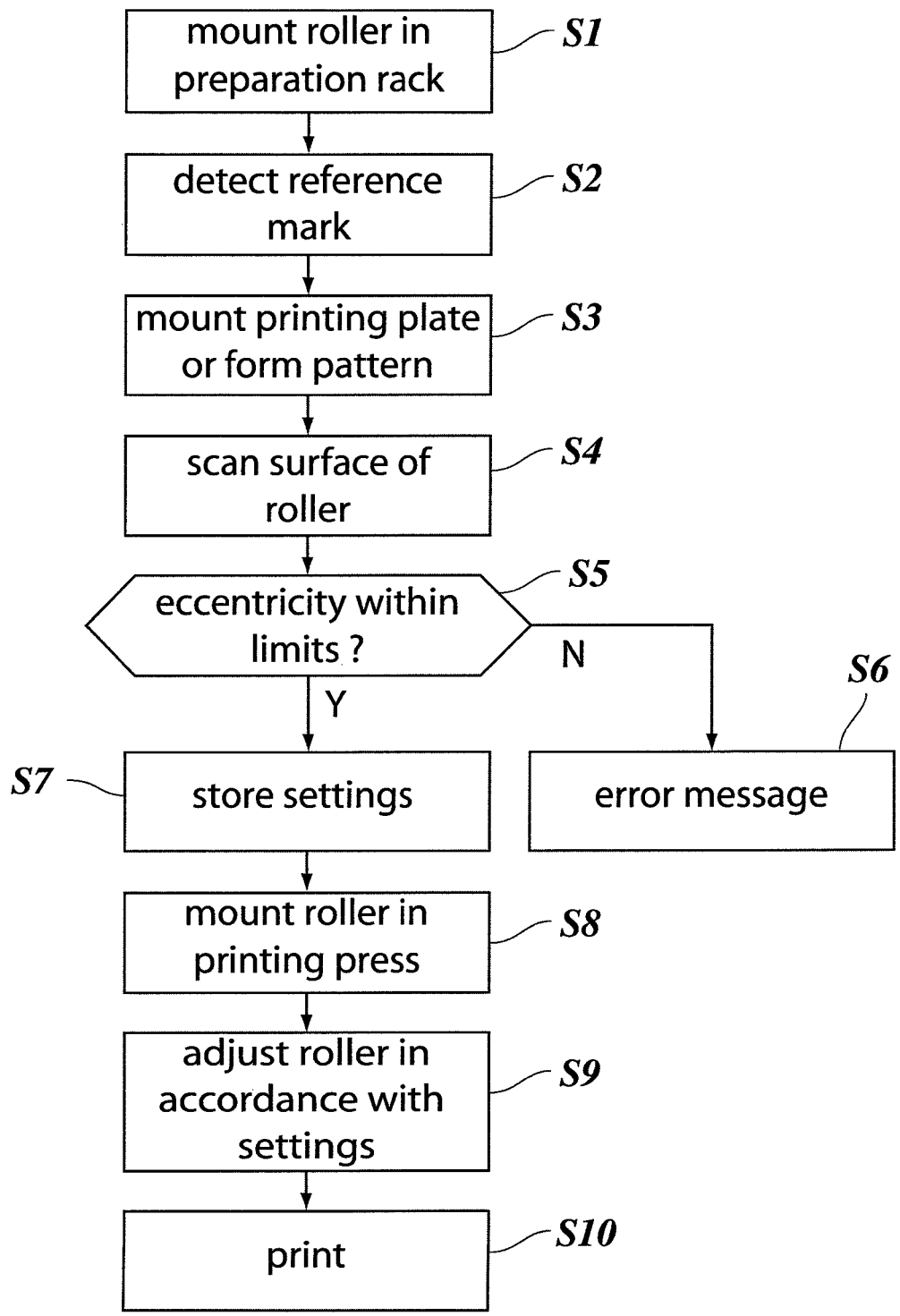
FIG. 8 is a block diagram illustrating a method according to the invention.

FIG. 8 is a flow diagram summarising the essential steps of the method according to the invention.

In step S1, the roller, e.g. one of the printing cylinders 18, 18', 18", 18‴ or the anilox roller 16, are mounted in a preparation rack, e.g. the mounter 24, the rack 86 shown in FIG. 3, or a gravure apparatus for a gravure printing cylinder.

In step S2, the reference mark is detected. In this step, it is possible to adjust the angular and axial position of the roller until the reference mark is precisely aligned with the detector, so that no offset data need to be measured and transmitted to the actuator control unit 50 in the printing deck. In a preferred embodiment, however, the reference mark is only roughly aligned with the detector, and offset data are measured, so that the process of mounting and aligning the roller in the preparation rack is simplified.

In step S3, the printing plates are mounted on the printing cylinder, or a printing pattern is formed, if the roller is a printing cylinder. In case of an anilox roller, this step may be skipped.

In step S4, the surface of the roller is scanned with the laser head 44 so as to sample the topography data. These data may be subjected to a first analysis in the control unit 40 of the preparation deck (mounter 24), in order to, for example, determine the eccentricity of the roller. Then, it is checked in step S5 whether the eccentricity is within certain limits which will assure a satisfactory print quality. If this is not the case, an error message is issued in step S6. Otherwise, the (non calibrated) set data for the side register, the 200 longitudinal register and the X'-position of the roller are calculated and stored in step S7.

In a modified embodiment, the eccentricity data may be included in the set data and may then be used by the control unit 50 of the printing press for controlling the actuators 66, 72 throughout the operation time of the printing press, in synchronism with the rotation of the roller, so as to compensate for the eccentricity of the roller. In this case, the step S5 may be skipped, or larger tolerances for the eccentricity may be accepted.

Subsequent to step S7, the roller is removed from the preparation rack and mounted in the pertinent colour deck of the printing press (step S8).

Then, in step S9, the set data are calibrated for the colour deck and the print run, the reference mark is detected with the detector 52 in the printing press, and the roller is adjusted as has been described in conjunction with FIG. 2.

When the adjustment process is completed, the print run can immediately start in step S10 and will provide high quality images on the web 20, without any production of waste.

Figure 9:
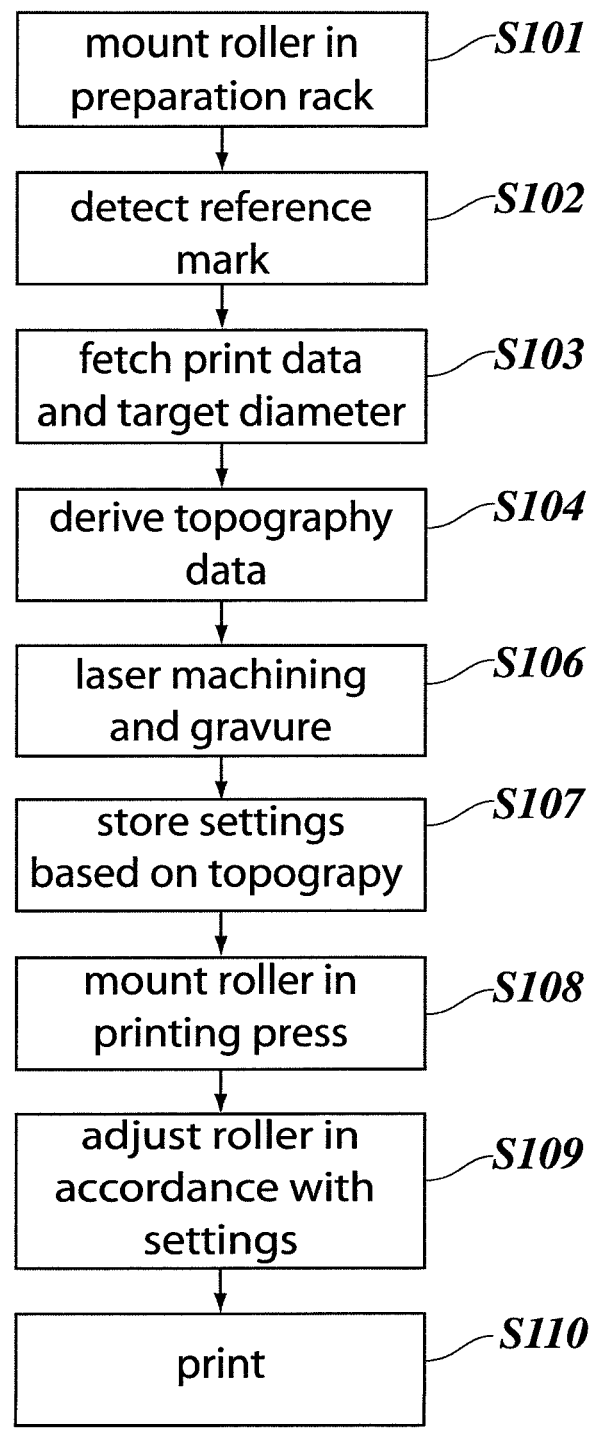
FIG. 9 is a block diagram of a method according to another embodiment of the invention.

FIG. 9 is a flow diagram for a method according to a modified embodiment of the invention. This method is applicable for printing cylinders of the type shown in FIG. 4 or 7, wherein the printing pattern is formed directly on the surface of the cylinder, e.g. by laser gravure.

In step S101, the roller (printing cylinder) is mounted in the preparation rack. Then, the reference mark is detected in step S102. Print data that determine the printing pattern to be formed on the roller are fetched from a suitable date source in step S103. An exact value for the desired diameter of the roller is also determined in this step. Then, in step S104, the target diameter and the print data are processed to derive topography data that are suitable for controlling the laser of the laser gravure system. In step S106, the outer peripheral surface of the roller is machined, and the printing pattern is formed by laser gravure on the basis of the topography data. This step may optionally be composed of two sub-steps. In a first sub-step, the surface of the roller may be machined so as to obtain a smooth, exactly cylindrical surface which corresponds exactly to the desired target diameter of the roller. Then, in the second sub-step, the printing pattern is cut into that surface. In step S107, the set data for adjusting the roller in the printing press are determined on the basis of the topography data derived in step S104, and the settings are stored, e.g. on the RFID chip.

It should be observed that the sequence of the steps S101-S107 may be varied. For example, the steps S103, S104 and S107 may be performed before the roller is mounted in the rack.

When the printing pattern has been formed on the roller, the roller is removed from the rack and mounted in the printing press in step S108. Then, the roller is adjusted in accordance with the stored settings in step S109, and the print process is started in step S110.

This method is based on the fact that the surface of the roller can be machined with very high accuracy, so that the topography data derived in step S104, which describe the geometrical shape of the peripheral surface of the roller and possibly the printing pattern, can be relied upon to reflect the true topography of the roller when the same is mounted in the printing press in step S108.

Figure 10:
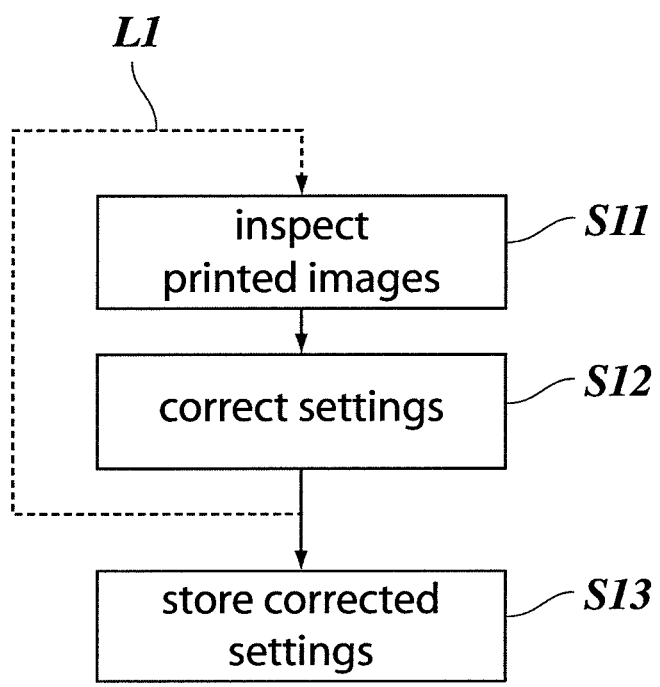
FIG. 10 is a block diagram of additional method steps that may be performed after a print run has started.

Optionally, when the print run has started in step S10 in FIG. 8 or in step S110 in FIG. 9, the adjustment of the roller in the printing press may be refined by performing steps S11-S13 that have been illustrated in FIG. 10. While the printing press is running and images are printed onto the web, the quality of the images is inspected in step S11, either visually by a human operator or automatically by means of a camera system and electronic image processing. If the quality of the images is found to be non-optimal, the settings are corrected in step S12. A symbolic loop L1 in FIG. 10 indicates that the steps S11 and S12 may be repeated as often as necessary, until the desired print quality has been achieved.

Finally, when the optimal settings have been found, the corrected settings are stored on a data carrier that is assigned to the roller, e.g. by writing with the read/write head 52a onto the RFID chip.

When the same roller is used in a later print run on the same printing press, information on the corrections that have been made in the first print run in step S12 are available for that roller and can again be read by the read/write head 52a, so that the adjustment process will now be based on the corrected and hence improved set data.

Figure 11:
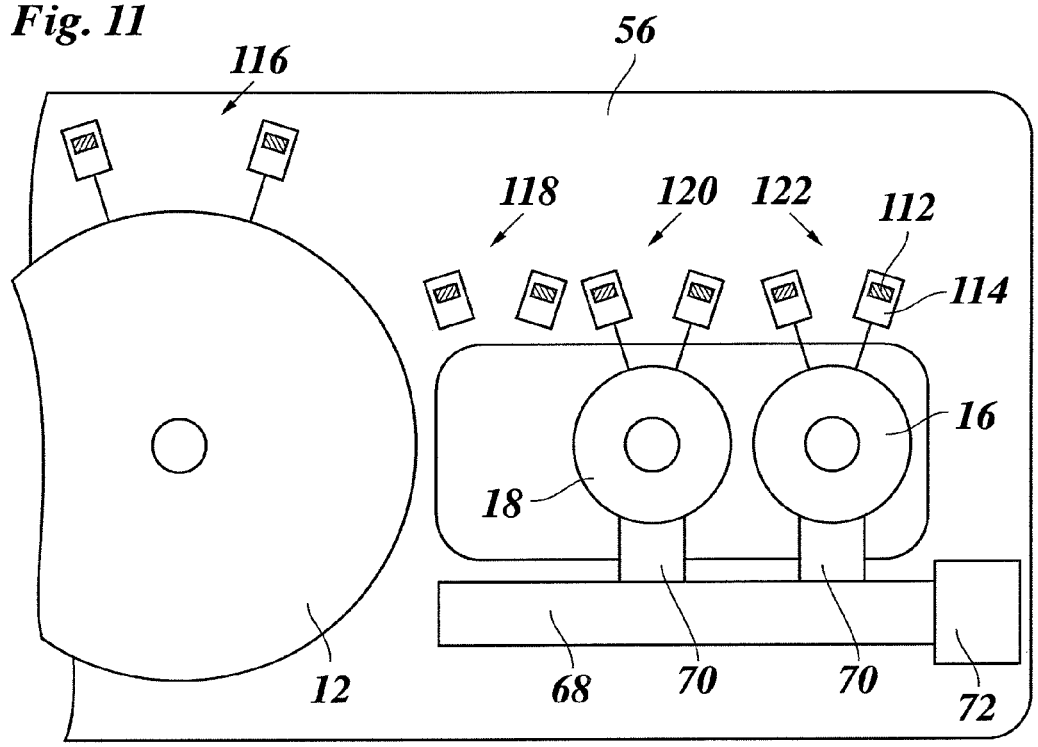
FIGS. 11 and 12 are schematic views of essential parts of a printing press suitable for performing a method according to yet another embodiment of the invention.

FIG. 11 is a schematic and simplified view of a flexographic printing press according to another embodiment. Only a single colour deck has been shown, and the drawing is not to scale.

The CI 12 is directly supported in the machine frame which is represented here by the frame member 56, and the anilox roller 16 and the printing cylinder 18 are supported in adjustable bearings 70. A number of high-precision guide rails 112 are rigidly secured to the machine frame and extend across the same over the entire length of the rollers, i.e. the CI 12, the anilox roller 16 and the printing cylinder 18. Each of the guide rails 112 carries a laser head 114 which, in the example shown, is slidable along the guide rail 112 in a controlled manner. For each guide rail 112, a linear encoder (not shown) is provided for detecting the exact position of the laser head 114.

The guide rails 112 and laser heads 114 form a first scanning equipment 116 associated with the CI 12 and second to fourth scanning equipments 118, 120 and 122 associated with the printing cylinder 18 and the anilox roller 16. Each scanning equipment comprises a pair of guide rails 112 and laser heads 114, and the laser heads face the peripheral surface of the respective roller and are angularly offset relative to one another about the axis of rotation of the respective roller. The function of the scanning equipments shown in FIG. 11 is comparable to the function of the laser head 44 and the rail 42 shown in FIG. 1. In this embodiment, however, the process of scanning the roller surface and detecting the topography thereof is not performed in a preparation rack or mounter but in the colour deck of the printing press itself. In addition, since each scanning equipment comprises (at least) two angularly offset laser heads, it is possible to detect also the exact location of the axes of rotation of the rollers relative to the machine frame. It should be noted that, since all the guide rails 112 are fixed to the machine frame, the axis locations of the printing cylinder and the anilox roller are detected relative to the machine frame, not relative to the adjustable bearings 70. Thus, it is possible to detect the exact locations of the rollers, irrespective of any play in the bearings or any distortions of the support structures for the rollers. On the basis of these data, the printing cylinder 18 and the anilox roller 16 can be adjusted relative to the CI 12 with improved accuracy.

Figure 12:
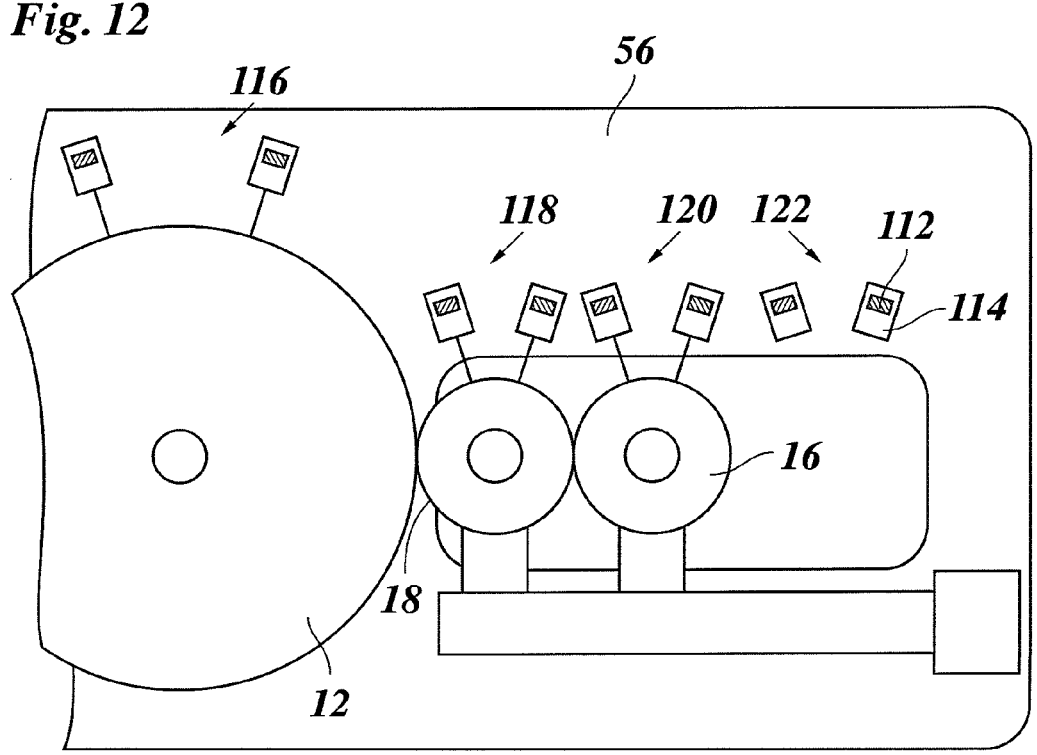

In FIG. 11, the anilox roller and the printing cylinder have been shown in their inactive position. Here, the surfaces of the printing cylinder and the anilox roller can be scanned with the third scanning equipment 120 and the fourth scanning equipment 122, respectively, while the printing cylinder and the anilox roller are rotated with a suitable speed. In this way, the topography data can be sampled and can then be used for deriving the appropriate settings, including the longitudinal register and the side register. Since the location of the printing pattern on the printing cylinder 18 can be detected directly with the scanning equipment 120, a reference mark is not compulsory in this embodiment. FIG. 12 illustrates the condition when the printing cylinder 18 has been set against the CI 12 and the anilox roller 16 has been set against the printing cylinder. In this condition, it is still possible to scan the printing cylinder 18, now by means of the second scanning equipment 118, and the anilox roller 16 can now be scanned with the third scanning equipment 120. Most importantly, it is still possible to detect the exact positions of the axes of rotation of the various rollers, so that any distortions caused by the forces acting between the rollers can be detected and compensated immediately, so that a satisfactory image quality will be achieved already after a few rotations of the printing cylinder. Moreover, it is possible in this embodiment to detect any eccentricities or the CI 12, so that, optionally, the set position of the printing cylinder and the anilox roller may permanently be adjusted during the print run so as to compensate for these eccentricities.

Of course, in a modified embodiment, some or all of the scanning equipments may be replaced by stationary laser heads, which detect only the positions of the axes of rotation but not the topography of the rollers. In this case, the topographies may be detected in a preparation rack or mounter, as has been described in conjunction with the previous embodiments.

Figure 13:
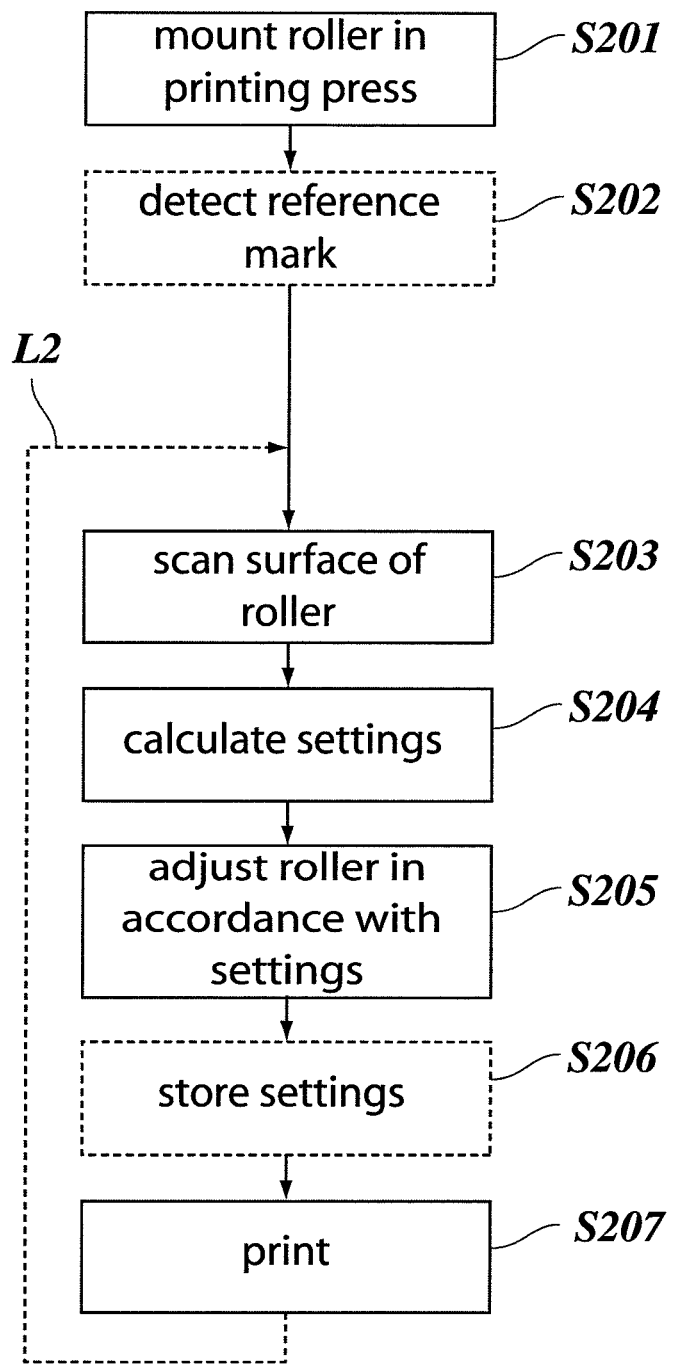
FIG. 13 is a block diagram of the method performed with the printing press according to FIGS. 11 and 12.

FIG. 13 is a flow diagram illustrating a method to be performed with the printing press illustrated in FIGS. 11 and 12. In step S201, the roller is, mounted in the printing press. The example shown in FIGS. 11 and 12, the roller will be the printing cylinder 18 and/or the anilox roller 16. However, the method according to this embodiment is not limited to flexographic printing but may equivalently be employed in other printing presses.

In an optional step S202, a reference mark on the roller is detected as has been described in conjunction with the previous embodiments. However, the detection of the reference mark now occurs within the printing press.

In step S203, the surface of the roller is scanned so as to detect the topography data, e.g., by means of the scanning equipment 120. Then, the settings for the roller are calculated in step S204, and the roller is adjusted in accordance with these settings in step S205. Optionally, the settings may be stored in a memory of the printing press or on an RFID chip on the roller, if present, in step S206. Then, the print run is started in step S207.

A symbolic loop L2 indicates, that the steps S203-S207 may be repeated even after the print run has started, so as to perform a fine-adjustment of the settings, as has been described before. As an alternative, the loop L2 may comprise only the steps S205-S207. Further, while the print run proceeds, the steps S203 and S204 may be replaced by a step of detecting only the positions of the axes of rotation of the rollers, with the laser heads 114 being held stationary.

Figure 14:
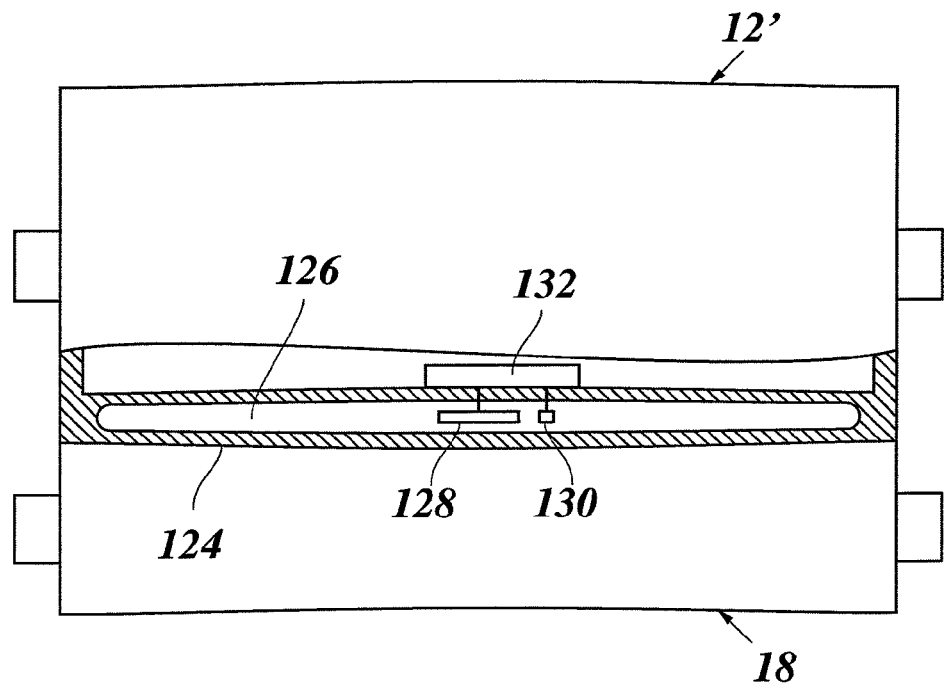
FIG. 14 is a schematic view, partly in section, of a central impression cylinder and a printing cylinder according to an embodiment of the invention.

FIG. 14 illustrates a construction of a CI 12' which is particularly useful in conjunction with the concepts of the present invention.

As is generally known in the art, the peripheral wall 124 of the CI has a jacket 126 in which a temperature-controlled fluid (water) is circulated. A heater 128 and a temperature sensor 130 are disposed in the jacket for controlling the temperature of the fluid by means of a control unit 132. The peripheral wall 124 of the CI has a certain thermal expansion coefficient and therefore expands and shrinks dependent on its temperature. Thus, by controlling the temperature of the water in the jacket 126, it is possible to control the temperature of the peripheral wall 124 and hence the thermal expansion thereof. In the shown embodiment, the control unit 132 receives the topography data of the printing cylinder 18 that have been stored on the RFID chip thereof. In this example, these topography data indicate that the printing cylinder 18 is not exactly cylindrical but has a negative crown (which is shown exaggeratedly in the drawing). The control unit 132 calculates the temperature of the water in the jacket 126 that is necessary for compensating the negative crown of the printing cylinder 18 by a corresponding positive crown of the CI 12'. Thus, in this example, the heater 128 is controlled to raise the temperature of the peripheral wall 124, so that this wall will expand. The thermal expansion of the wall 124 will occur in all directions and hence also in circumferential direction of the CI. This causes the peripheral wall 124 to bulge outwardly so as to adopt a positive crown.

In a modified embodiment, which has not been shown, the jacket 126 may be segmented in axial direction of the CI, so that the profile of the peripheral surface of the CI may be controlled with higher spatial resolution.

Figure 15:
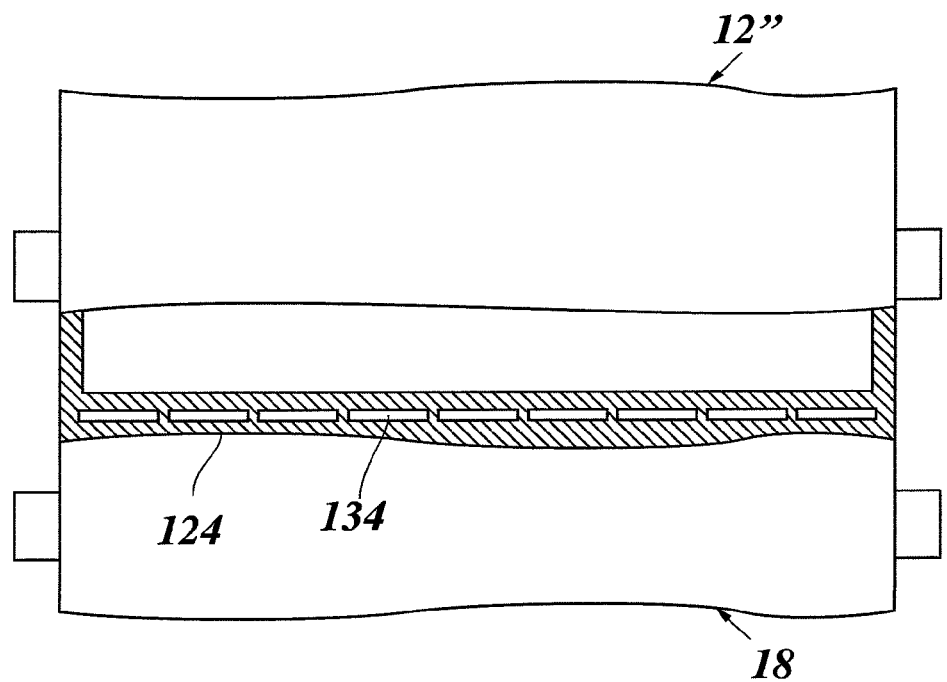
FIG. 15 is a schematic view, partly in section, of a central impression cylinder and a printing cylinder according to another embodiment.

FIG. 15 shows an embodiment of a CI 12" which has a number of heater segments 134 embedded in the peripheral wall 124, so that the temperature and the thermal expansion of the peripheral wall may be controlled directly by means of the heater segments. Specifically, the temperature may be controlled individually for each segment.

In this example, the printing cylinder 18 does not just have a simple crown, but has a rather complex profile which has again been exaggerated in the drawing. As in the embodiment described above, this profile is included in the topography data and is used for controlling the heater segments 134. In this way, the surface profile of the CI 12" can be controlled to exactly match the profile of the printing cylinder.

Whereas, in the examples described above, the surface of the roller or rollers have been scanned optically by means of a laser, it is also possible in a modified embodiment to provide for this scan process a mechanical system, e.g. a follower roll with an associated displacement detector. This has been illustrated in FIGS. 16 and 17.

Figure 16:
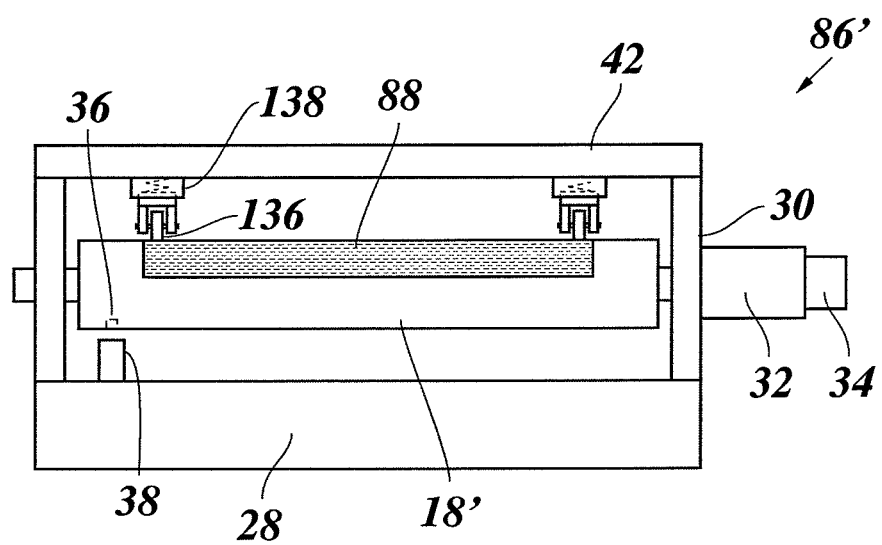
FIG. 16 shows a preparation rack according to a modified embodiment of the invention.

FIG. 16 shows a preparation rack 86' that has a construction similar to the preparation rack 86 in FIG. 3, but with the difference that, in place of the laser head, there are provided two follower rolls 136 which roll over the peripheral surface of the printing cylinder 18', preferably near both ends of this printing cylinder, at the respective ends of the printing pattern 88. Each follower roll is elastically biased against the peripheral surface of the printing cylinder 18' and is supported on a high precision displacement detector 138 which is itself mounted on the rail 42.

The positions of the displacement detectors 38 on the rail 42 may be adjustable, and there may for example be provided more than two displacement detectors with associated follower rolls. With this embodiment, it is possible to measure at least the excentricity and the exact diameter of the printing cylinder, and this at both ends of the printing part, so that a possible conicity of the printing cylinder may also be detected. According to another embodiment, which has not been shown, the follower roll 136 may be replaced by a follower ball supported in a universal bearing, and the associated displacement detector may be slidable along the rail 42, so that the entire surface profile of the printing cylinder can be scanned.

The diameter of the follower roll 136 and the follower ball, respectively, should be selected such that, on the one hand, the roll resistance will be sufficiently small, and, on the other hand, the mass of inertia will be so small that the displacement detector may follow the surface contour of the printing cylinder quickly enough. Optionally, the follower roll and the associated bearing may be held on the rail 42 by means of a pivoting arm. In this case, the displacement detector will detect the angular displacement of this arm.

Of course, the construction shown in FIG. 16 may analogously be applied to the mounter 24 shown in FIG. 1. In this case, the follower rolls may also be used for detecting the position of the printing plates 26 at least in circumferential direction of the printing cylinder.

Figure 17:
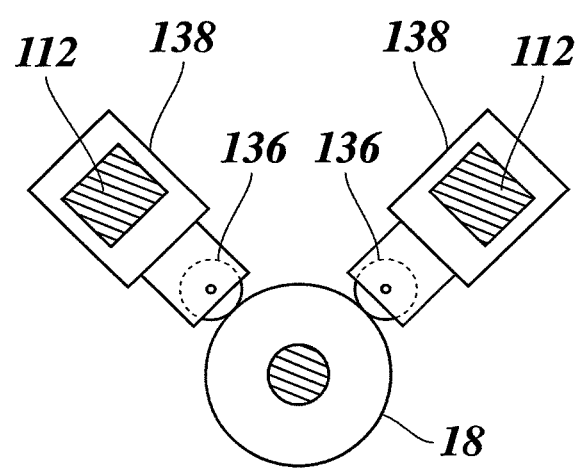
FIG. 17 shows parts of a printing press according another embodiment of the invention.

As has been shown in FIG. 17, the scan equipments 116, 118, 120 and 122 of the printing press shown in FIG. 11 may correspondingly be replaced by combinations of follower rolls 136 and displacement detectors 138.

Figure 18:
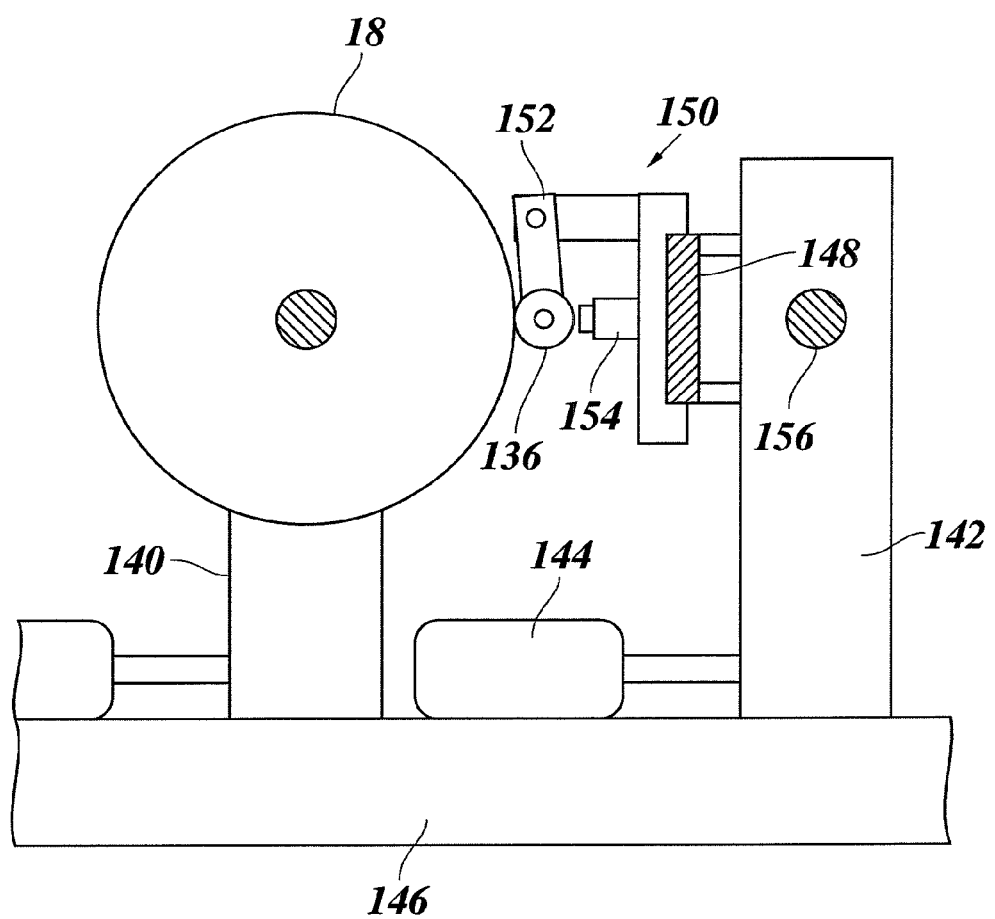
FIG. 18 is a sketch showing the principles of a mechanical scanning system.

FIG. 18 illustrates another possible embodiment of the mechanical scanning system employing a follower roll 136. The printing cylinder 18 is rotatably supported on bearing blocks 140 whereas the scanning system is supported on separate bearing blocks 142. At least one of the sets of bearing blocks 140, 142 can be moved in a controlled manner, by means of a numerically controlled drive system 144, along a rail 146 that extends at right angles to the axis of the printing cylinder 18.

Mounted to the bearing blocks 142 is a guide rail 148 that extends in parallel with the printing cylinder 18 and has a high bending strength and which carries an adjustable holder 150 for the follower roll 136. The follower roll 136 is suspended pendularly by means of an arm 152, so that it will engage the printing cylinder 18 and will roll over the peripheral surface thereof under its own weight (and possibly an additional weight). Further, an eddy current distance sensor 154 is mounted on the holder 150 in such a manner that it faces the metal peripheral surface of the follower roll 136 in a position diametrically opposite to the printing cylinder 18. The distance sensor 154 is adapted to precisely measure the width of the gap formed between this sensor and the peripheral surface of the follower roll 136. Thanks to the pendular suspension of the follower roll, the width of this gap varies in accordance with the topography of the surface of the printing cylinder 18.

This arrangement has the advantage that the distance sensor detects directly the follower roll 136 that rolls over the surface of the printing cylinder 18, so that any possible inaccuracies in the bearing structure for the follower roll will not hamper the accuracy of measurement. This permits a quick and precise measurement of the surface profile of the printing cylinder 18 (or any other roller) in the axial position to which the holder 150 has been adjusted. Of course, several holders 150 may be arranged along the guide rail 148, so that the printing cylinder 18 can be scanned at several positions. The scan positions may be selected by the operator in such a manner that the surface profile is scanned at locations of the printing cylinder 18 that are particularly critical.

For performing a measurement, the bearing blocks 142 are driven into a position where the follower roll 136 engages the peripheral surface of the printing cylinder 18 in the manner shown in FIG. 18 and is slightly deflected. However, a gap should remain between the follower roll and the distance sensor 154, with the width of this gap corresponding at least to the expected dimensional tolerance of the printing cylinder 18. The position of the locus on the peripheral surface of the printing cylinder 18 that is engaged by the follower roll 136, which position is preferably level with the axis of rotation of the printing cylinder, can then be derived from the known set positions of the bearing blocks 142, the known geometry of the holder 150, the diameter of the follower roll 136 and the value measured by the distance sensor. It is a remarkable advantage of this mechanical scanning system that the measurement result is independent of the material and condition of the surface of the printing cylinder 18 and the printing plates, respectively, that are mounted thereon.

Optionally, this scanning principle may also be combined with the laser scan system described above. Then, the laser may be used for scanning the surface of the printing cylinder on the entire width with low resolution, and those locations where it is desirable to know the surface profile more exactly, are selected for the holders 150, so that the profile may precisely be measured by means of the follower rolls.

The detection system shown in FIG. 18 may be integrated in a mounter or any other preparation rack and also in the printing press itself. When the mechanical scanning system is integrated in the printing press, the bearing blocks 142 may for example be the bearing blocks of the anilox roller. This is why FIG. 18 shows a mandrel 156 onto which the anilox roller may be thrust-on. Then, the guide rail 148 should be mounted on the bearing blocks 142 in such a manner that it can be tilted out of the way during the operation of the printing press, when the anilox roller is installed.

In a modified embodiment, the rotating follower rolls 136 may be replaced by a rigid follower pin that slides over the surface of the printing cylinder 18. When the printing cylinder 18 is a steel gravure printing cylinder, the arm 152 and the follower roll may also be dispensed with, and the distance sensor 154 may be arranged such that it measures directly the distance to the surface of the printing cylinder.

In place of the eddy current distance sensor 154, other non-contact sensor types may also be used, e.g. an optical sensor.

So-called "cromatic distance sensors" have become known, wherein the surface to be scanned is irradiated with white light and the light reflected or scattered at the surface is focused by a lens. Since the refractivity of the lens is different for different colours of light, the focal length of the lens will be different for different colour components, so that the colour that is measured by a colour-sensitive optical element near the focal point will depend upon the distance of the reflecting surface and will thus permit a distance measurement. The surface to be measured may optionally be the surface of the follower roll 136 or directly the surface of the printing cylinder 18.

Another possible measurement method would be to measure the surface of the printing cylinder 18 by means of a shadow-effect laser micrometer.

What is claimed is:

1. A scanning system for measuring a surface profile of a rotating cylinder, the scanning system comprising:
   a follower roll having a peripheral surface, the follower roll being movably supported to roll over the rotating cylinder;
   a contactless distance sensor fixedly mounted at a distance from the peripheral surface of the follower roll in a position opposite to the rotating cylinder, the contactless distance sensor configured to measure a position of the peripheral surface of the follower roll; and
   a control unit configured to derive and to output the surface profile of the rotating cylinder based on the position of the peripheral surface of the follower roll measured by the contactless distance sensor.

2. The scanning system according to claim 1, wherein the follower roll comprises a peripheral surface made of metal, and the distance sensor is an eddy current sensor.

3. The scanning system according to claim 1, wherein the rotating cylinder is provided as part of a rotary printing press.

4. A rotary printing press comprising a rotating cylinder and a scanning system configured to measure a surface profile of the rotating cylinder, the rotary printing press comprising:
   the rotating cylinder including a printing pattern;
   a follower roll positioned and configured to roll over the rotating cylinder and having a peripheral surface;
   a contactless eddy current distance sensor mounted at a distance from the peripheral surface of the follower roll in a position opposite to the rotating cylinder, the contactless eddy current distance sensor configured to measure a position of the peripheral surface of the follower roll; and
   a control unit configured to derive and to output the surface profile of the rotating cylinder based on the position of the peripheral surface of the follower roll measured by the contactless distance sensor.

5. A rack for mounting printing plates on a printing cylinder or for creating a printing pattern on the surface of the printing cylinder, the printing cylinder having a surface profile, the rack being configured to rotatably support the printing cylinder and comprising:
   a detector configured to detect a reference mark on the printing cylinder;
   a follower roll positioned and configured to roll over the rotating cylinder and having a peripheral surface;
   a contactless eddy current distance sensor mounted at a distance from the peripheral surface of the follower roll in a position opposite to the rotating cylinder, the contactless eddy current distance sensor configured to measure a position of the peripheral surface of the follower roll; and
   a control unit configured to derive and to output the surface profile of the rotating cylinder based on the position of the peripheral surface of the follower roll measured by the contactless distance sensor.

6. A scanning system for measuring a surface profile of a rotating cylinder of a rotary printing press, the scanning system comprising:
   a follower having a peripheral surface, the follower being movably supported to move over the rotating cylinder;
   a contactless distance sensor fixedly mounted at a distance from the peripheral surface of the follower in a position opposite to the rotating cylinder, the contactless distance sensor configured to measure a position of the peripheral surface of the follower; and
   a control unit configured to derive and to output the surface profile of the rotating cylinder based on the position of the peripheral surface of the follower measured by the contactless distance sensor.

* * * * *

UNITED STATES PATENT AND TRADEMARK OFFICE
CERTIFICATE OF CORRECTION

PATENT NO. : 8,534,194 B2  Page 1 of 1
APPLICATION NO. : 12/446738
DATED : September 17, 2013
INVENTOR(S) : Whitelaw et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 687 days.

Signed and Sealed this
Fifteenth Day of September, 2015

Michelle K. Lee
*Director of the United States Patent and Trademark Office*